US00RE35672E

United States Patent [19]

Taguchi

[11] E Patent Number: Re. 35,672

[45] Reissued Date of Patent: Nov. 25, 1997

[54] SLANT PLATE TYPE COMPRESSOR WITH VARIABLE CAPACITY CONTROL MECHANISM

[75] Inventor: Yukihiko Taguchi, Maebashi, Japan

[73] Assignee: Sanden Corporation, Gunma, Japan

[21] Appl. No.: 627,414

[22] Filed: Apr. 4, 1996

Related U.S. Patent Documents

Reissue of:

[64] Patent No.: 5,332,365
Issued: Jul. 26, 1994
Appl. No.: 957,370
Filed: Oct. 7, 1992

[30] Foreign Application Priority Data

Oct. 7, 1991 [JP] Japan ..... 3-081339 U
Oct. 23, 1991 [JP] Japan ..... 3-275824

[51] Int. Cl.[6] ..... F04B 1/26

[52] U.S. Cl. ..... 417/222.2; 417/270

[58] Field of Search ..... 417/222.2, 222.1, 417/270

[56] References Cited

U.S. PATENT DOCUMENTS

| | | | |
|---|---|---|---|
| 4,037,993 | 7/1977 | Roberts | 417/222.2 |
| 4,171,191 | 10/1979 | Roberts | 417/222.2 |
| 4,428,718 | 1/1984 | Skinner | 417/222.2 |
| 4,526,516 | 7/1985 | Swain et al. | 417/222.2 |
| 4,606,705 | 8/1986 | Parekh | 417/222.2 |
| 4,621,983 | 11/1986 | Thomas et al. | 417/222.2 |
| 4,685,866 | 8/1987 | Takenaka et al. | 417/222.2 |
| 4,688,997 | 8/1987 | Suzuki et al. | 417/222.2 |
| 4,723,891 | 2/1988 | Takenaka et al. | 417/222.2 |
| 4,730,986 | 3/1988 | Kayukawa et al. | 417/222.2 |
| 5,071,321 | 12/1991 | Skinner et al. | 417/222.2 |
| 5,092,741 | 3/1992 | Taguchi | 417/222.2 |
| 5,094,589 | 3/1992 | Terauchi | 417/222.2 |
| 5,145,326 | 9/1992 | Kimura et al. | 417/222.2 |
| 5,174,727 | 12/1992 | Terauchi et al. | 417/222.2 |

FOREIGN PATENT DOCUMENTS

| | | | |
|---|---|---|---|
| 62-72473 | 5/1987 | Japan | 417/222.2 |
| 64-27487 | 2/1989 | Japan | 417/222.2 |

*Primary Examiner*—Timothy Thorpe
*Assistant Examiner*—Peter G. Korytnyk
*Attorney, Agent, or Firm*—Baker & Botts, L.L.P.

[57] ABSTRACT

A variable capacity type slant plate type compressor including a crank chamber, a suction chamber and a discharge chamber is disclosed. The crank chamber is linked by a first communication path to the suction chamber, and is linked by a second communication path to the discharge chamber. A first valve control mechanism is disposed within the first communication path and second valve control mechanism is disposed within the second communication path. Fluid communication between the crank and suction chambers is controlled by the first valve control mechanism so that the suction chamber pressure is maintained at one predetermined constant value while fluid communication between the crank and discharge chambers is continuously closed. Fluid communication between the crank and discharge chambers is opened by the second valve control mechanism when the predetermined constant value of the suction chamber pressure must be increased. However, in the latter condition, fluid communication between the crank and suction chambers is continuously closed as long as the crank chamber pressure is not abnormally increased.

5 Claims, 6 Drawing Sheets

SLANT PLATE TYPE COMPRESSOR WITH VARIABLE CAPACITY CONTROL MECHANISM

Matter enclosed in heavy brackets [ ] appears in the original patent but forms no part of this reissue specification; matter printed in italics indicates the additions made by reissue.

BACKGROUND OF THE INVENTION

1. Technical Field

The present invention generally relates to a refrigerant compressor, and more particularly, to a slant plate type compressor, such as a wobble plate type compressor, with a variable displacement mechanism which is suitable for use in an automotive air conditioning system.

2. Description Of The Prior Art

A wobble plate type compressor with a variable displacement mechanism suitable for use in an automotive air conditioning system is disclosed in Japanese Utility Model Application Publication No. 64-27487. The compressor is driven by a the engine of the automobile.

The above compressor includes a variable displacement mechanism which comprises a first communication path linking a crank chamber and a suction chamber in fluid communication, and a second communication path linking the crank chamber and a discharge chamber. A first valve control mechanism controlling the opening and closing of the first communication path is disposed within the first communication path. A second valve control mechanism controlling the opening and closing of the second communication path is disposed within the second communication path. The first communication path is provided with a first valve seat formed at one portion thereof. The second communication path is provided with a second valve seat formed at one portion thereof. The first valve control mechanism includes a first valve member which is disposed so as to be received on and moved away from the first valve seat. The second valve control mechanism includes a second valve member which is disposed so as to be received on and moved away from the second valve seat.

The first and second valve members are linked through a rod member so that when the first valve member is received on the first valve seat to close the first communication path, the second valve member is moved away from the second valve seat to open the second communication path. Conversely, when the first valve member is moved away from the first valve seat, the second valve member is received on the second valve seat.

During operation of the compressor, the capacity of the compressor depends upon the crank chamber pressure relative to the suction chamber pressure, with the compressor operating at maximum capacity when the crank and suction chambers are linked in fluid communication. When the link between the crank and suction chambers is terminated, simultaneously linking the crank and discharge chambers, the pressure in the crank chamber increases relative to the suction chamber due to the flow of high pressure fluid from the discharge chamber to the crank chamber, thereby reducing capacity. Of course, when operating at reduced capacity, the power demands of the compressor on the automobile engine are reduced as well.

The first valve control mechanism includes a pressure sensing device such as a diaphragm, one side of which senses the pressure in the suction chamber. The opposite side of the diaphragm is acted upon by a cylindrical member made of magnetic material and forming part of a solenoid mechanism. The relative position of the cylindrical member, and thus the effective force provided thereby upon the diaphragm, is controlled by the solenoid in response to an external vehicle condition, such as the power demands made upon the engine of the vehicle.

The diaphragm is responsive to the net force acting on the opposite sides thereof and acts upon the rod member linking the first and second valve members to simultaneously control the opening and closing of the two communication paths. For a given positioning of the cylindrical member, the effect thereof on the diaphragm is constant, and the diaphragm responds to changes in the suction pressure to act upon the rod member to control the link between the crank and suction chambers. Thus, for a given positioning of the cylindrical member, the first valve member acts to maintain the suction pressure at a predetermined constant value. By changing the position of the cylindrical member through operation of the solenoid in response to the demands made upon the engine of the vehicle, the predetermined constant value of the suction pressure can be changed in response to the demands made upon the engine.

As discussed above, the compressor operates at maximum capacity when the crank and suction chambers are linked. This linkage occurs when the suction pressure exceeds the predetermined constant value and acts upon the diaphragm to move the first valve member away from the first valve seat, simultaneously isolating the crank and discharge chambers. For example, when the heat load on the evaporator of the automotive air conditioning system is great, the suction pressure will be great, causing the crank and suction chambers to be linked, maximizing capacity.

However, when the first valve member acts to maintain the suction pressure at the predetermined constant value for the given positioning of the cylindrical member, the second valve member which is linked to the first valve member through the rod member continuously receives the discharge pressure. The value of the discharge pressure is varied by unexpected changes in heat exchanging capability of a condenser of the automotive air conditioning system caused by such conditions as changes in velocity of the automobile. Accordingly, the force acting downwardly on the rod member can be unexpectedly varied in response to changes in the discharge pressure so that an undesirable change in the predetermined constant value in the suction chamber can occur even though an electric current at a constant amperage is supplied to the solenoid to provide a constant electromagnetic force. Thus, in this prior art compressor, the suction pressure cannot be stably maintained at a predetermined constant value by controlling communication between the crank and suction chambers.

Furthermore, in the above prior art compressor, when power demand on the vehicle is great, it is not desirable for the compressor to operate at maximum capacity, even if the heat load on the evaporator and the corresponding suction pressure are large. The solenoid is responsive to the greater demand for power to increase the effect of the cylindrical member upon the diaphragm, for example, by reducing the force with which the cylindrical member is pulled away from the diaphragm. Thus, the predetermined constant value at which the suction pressure is maintained will be increased, requiring an even greater pressure in the suction chamber before the crank and suction chambers can be linked.

For example, even if suction pressure is increased due to an increase of the heat load on the evaporator, the compressor will not function at maximum capacity while the demand for engine power by the vehicle is large, since the crank and suction chambers will be isolated. Correspondingly, the crank and discharge chambers will be linked, rapidly increasing the crank pressure relative to the suction pressure to minimize compressor capacity. Accordingly, the energy derived from the engine of the vehicle is effectively used for driving the vehicle. However, the pressure in the crank chamber may be increased to an excessively high value and maintained at that value until the crank and suction chambers are again linked, resulting in damage to the internal components of the compressor.

In order to address the above described defect, a safety valve device is proposed in Japanese Utility Model Application Publication No. 62-72473. This safety valve device includes a ball member and a coil spring elastically supporting the ball member and is disposed in a third communication path which links one portion of the first communication path upstream of the suction pressure sensing device to another portion of the first communication path downstream of the suction pressure sensing device. The safety valve device opens and closes the third communication path in response to changes in the pressure differential between the crank and suction chambers. The third communication path is opened when the pressure differential between the crank and suction chambers exceeds a predetermined value which is set to avoid damage to the internal components of the compressor. Therefore, when communication between the crank and suction chambers is blocked while communication between the crank and discharge chambers is opened during operation of the variable displacement mechanism (which may cause an abnormal rise in crank chamber pressure by conducting refrigerant gas from the discharge chamber to the crank chamber), the third communication path is opened to forcibly and quickly reduce the crank chamber pressure and thereby prevent an abnormal pressure differential between the crank and suction chambers. As a result, excessive friction between the internal components of the compressor caused by the abnormal differential between the crank and suction chambers can be prevented.

In the latter variable displacement mechanism, the third communication path is separate from the first and second communication paths so that the process of forming the third communication path and the process of disposing the safety valve device in the third communication path are additional steps required during the manufacturing of the compressor. Accordingly, the manufacturing process of the compressor is greatly complicated.

SUMMARY OF THE INVENTION

Accordingly, it is an object of the present invention to provide a variable capacity slant plate type compressor in which pressure in a suction chamber is stably maintained at a desired value.

It is another object of the present invention to provide a variable capacity slant plate type compressor in which the capacity of the compressor can be quickly reduced without causing damage to the internal components of the compressor.

A slant plate type refrigerant compressor according to the present invention includes a compressor housing enclosing a crank chamber, a suction chamber and a discharge chamber. The compressor housing includes a cylinder block having a plurality of cylinders formed therethrough, and a piston slidably fitted within each of the cylinders. A drive mechanism is coupled to the pistons for reciprocating the pistons within the cylinders. The drive mechanism includes a drive shaft rotatably supported in the housing and a coupling mechanism which drivingly couples the drive shaft to the pistons so that the rotating motion of the drive shaft is converted into reciprocating motion of the pistons. The coupling mechanism includes a slant plate having a surface disposed at an adjustable inclined angle relative to a plane perpendicular to the drive shaft. The inclined angle of the slant plate changes in response to a change in pressure in the crank chamber relative to pressure in the suction chamber to change the capacity of the compressor.

A first communication path links the crank chamber with the suction chamber. A first valve control mechanism is disposed within the first communication path. The first valve control mechanism controls fluid communication in the first communication path in response to changes in pressure in the suction chamber.

A second communication path links the crank chamber with the discharge chamber. A second valve control mechanism is disposed within the second communication path. The second valve control mechanism responds to an external signal and opens the second communication path to increase the pressure in the crank chamber to thereby reduce the capacity of the compressor.

Fluid communication in the first communication path is continuously controlled by the first valve control mechanism so that the pressure in the suction chamber is maintained at a predetermined constant value as long as the second communication path is closed. The second communication path is continuously opened as long as the first communication path is closed.

DETAILED DESCRIPTION OF THE PREFERRED EMBODIMENTS

Figure 1:
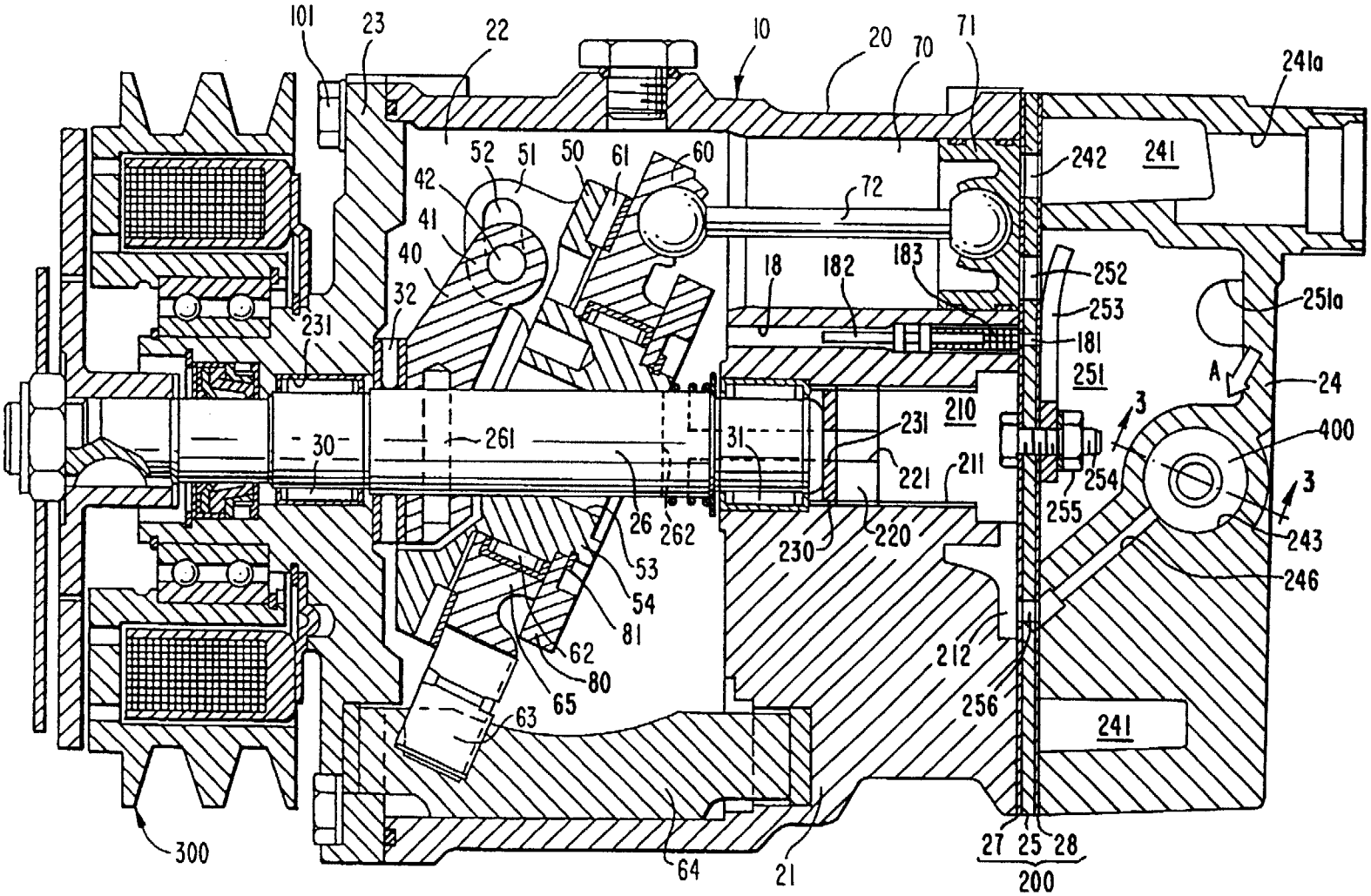
FIG. 1 illustrates a vertical longitudinal sectional view of a slant plate type refrigerant compressor including a capacity control mechanism according to one embodiment of this invention.
Figure 2:
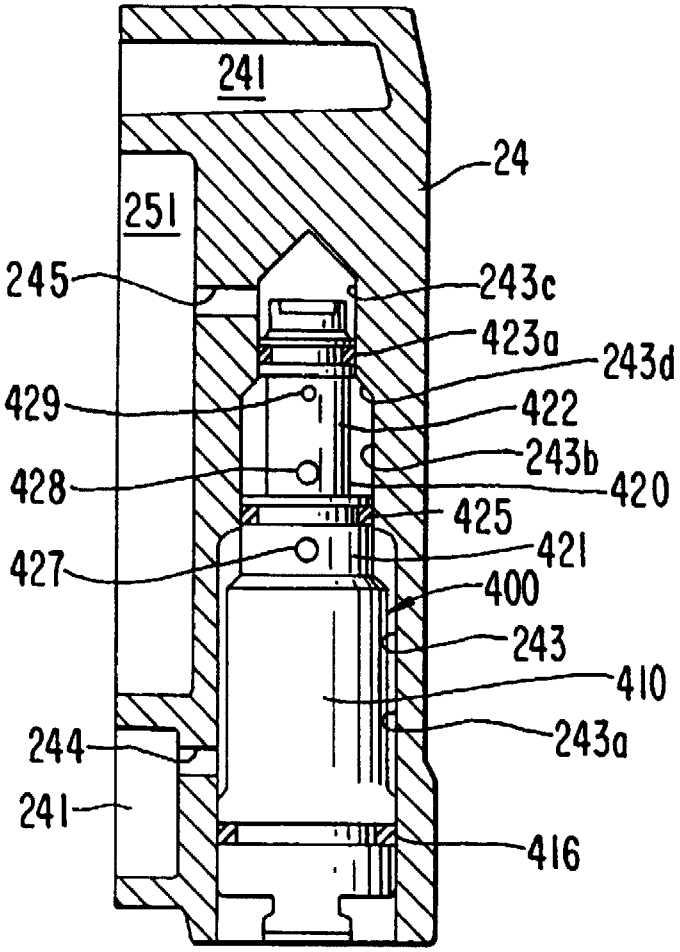
FIG. 2 illustrates a cross-sectional view of capacity control mechanism 400 from the direction indicated by arrow A of FIG. 1.

In FIGS. 1 and 2, for purposes of explanation only, the left side of the figures will be referenced as the forward end or front of the compressor, and the right side of the figures will be referenced as the rearward end or rear of the compressor.

With reference to FIG. 1, the construction of a slant plate type compressor, and more specifically a wobble plate type refrigerant compressor 10, having a capacity control mechanism in accordance with one embodiment of the present invention is shown. Compressor 10 includes cylindrical housing assembly 20 including cylinder block 21, front end plate 23 disposed at one end of cylinder block 21, crank chamber 22 enclosed within cylinder block 21 by front end plate 23, and rear end plate 24 attached to the other end of cylinder block 21. Front end plate 23 is mounted on cylinder block 21 forward of crank chamber 22 by a plurality of bolts 101. Rear end plate 24 is also mounted on cylinder block 21 at the opposite end by a plurality of bolts (not shown). Valve plate 25 is located between rear end plate 24 and cylinder block 21. Opening 231 is centrally formed in front end plate 23 for supporting drive shaft 26 by bearing 30 disposed therein. The inner end portion of drive shaft 26 is rotatably supported by bearing 31 disposed within central bore 210 of cylinder block 21. Bore 210 extends to a rear end surface of cylinder block 21.

Bore 210 includes thread portion 211 formed at an inner peripheral surface of a central region thereof. Adjusting screw 220 having a hexagonal central hole 221 is screwed into thread portion 211 of bore 210. Circular disc-shaped spacer 230 having central hole 231 is disposed between the inner end surface of drive shaft 26 and adjusting screw 220. Axial movement of adjusting screw 220 is transferred to drive shaft 26 through spacer 230 so that three elements move axially within bore 210. The above mentioned construction and functional manner are described in detail in U.S. Pat. No. 4,948,343 to Shimizu.

Cam rotor 40 is fixed on drive shaft 26 by pin member 261 and rotates with drive shaft 26. Thrust needle bearing 32 is disposed between the inner end surface of front end plate 23 and the adjacent axial end surface of cam rotor 40. Cam rotor 40 includes arm 41 having pin member 42 extending therefrom. Slant plate 50 is disposed adjacent cam rotor 40 and includes opening 53. Drive shaft 26 is disposed through opening 53. Slant plate 50 includes arm 51 having slot 52. Cam rotor 40 and slant plate 50 are connected by pin member 42, which is inserted in slot 52 to create a hinged joint. Pin member 42 is slidable within slot 52 to allow adjustment of the angular position of slant plate 50 with respect to a plane perpendicular to the longitudinal axis of drive shaft 26. A balance weight ring 80 having a substantial mass is disposed on a nose of hub 54 of slant plate 50 in order to balance the slant plate S0 under dynamic operating conditions. Balance weight ring 80 is held in place by means of retaining ring 81.

Wobble plate 60 is nutatably mounted on hub 54 of slant plate 50 through bearings 61 and 62 which allow slant plate 50 to rotate with respect to wobble plate 60. Fork-shaped slider 63 is attached to the radially outer peripheral end of wobble plate 60 and is slidably mounted about sliding rail 64 disposed between front end plate 23 and cylinder block 21. Fork-shaped slider 63 prevents the rotation of wobble plate 60 so that wobble plate 60 nutates along rail 64 when cam rotor 40, slant plate 50 and balance weight ring 80 on hub 54 of slant plate 50 rotate. Undesirable axial movement of wobble plate 60 on hub 54 of slant plate 50 is prevented by contact between a rear end surface of inner annular projection 65 of wobble plate 60 and a front end surface of balance weight ring 80. Cylinder block 21 includes a plurality of peripherally located cylinder chambers 70 in which pistons 71 are slidably fitted. Each piston 71 is connected to wobble plate 60 by a corresponding connecting rod 72. Accordingly, nutation of wobble plate 60 thereby causes pistons 71 to reciprocate within their respective chambers 71.

Rear end plate 24 includes peripherally located annular suction chamber 241 and centrally located discharge chamber 251. Valve plate 25 includes a plurality of valved suction ports 242 linking suction chamber 241 with respective cylinders 70. Valve plate 25 also includes a plurality of valved discharged ports 252 linking discharge chamber 251 with respective cylinders 70. Suction ports 242 and discharge ports 252 are provided with suitable reed valves as described in U.S. Pat. No. 4,011,029 to Shimizu.

Suction chamber 241 includes inlet portion 241a which is connected to an evaporator (not shown) of the external cooling circuit. Discharge chamber 251 is provided with outlet port 251a connected to a condenser (not shown) of the cooling circuit. Gaskets 27 and 28 are located between cylinder block 21 and the front surface of valve plate 25 and between the rear surface of valve plate 25 and rear end plate 24, respectively, to seal the mating surfaces of cylinder block 21, valve plate 25 and rear end plate 24. Gaskets 27 and 28 and valve plate 25 thus form valve plate assembly 200. A steel valve retainer 253 is fixed on a central region of the rear surface of valve plate assembly 200 by bolt 254 and nut 255. Valve retainer 253 prevents excessive bend of the reed valve which is provided at discharge port 252 during a compression stroke of pistons 71.

Conduit 18 axially bored through cylinder block 21 so as to link crank chamber 22 to discharge chamber 25 1 through hole 181 which is axially bored through valve plate assembly 200. A throttling device, such as orifice tube 182, is fixedly disposed within conduit 18. Filter member 183 is disposed in conduit 18 at the rear of orifice tube 182. Accordingly, a portion of the discharged refrigerant gas in discharger chamber 251 always flows into crank chamber 22 with a reduced pressure generated by orifice tube 182. The above mentioned construction and functional manner are described in detail in Japanese Patent Application Publication No. 1-142277.

With reference to FIG. 2, radially extending cylindrical cavity 243 is formed in rear end plate 24 to accommodate capacity control mechanism 400 which is further discussed below. One end of cylindrical cavity 243 is open to the external environment outside of the compressor, that is, to atmospheric conditions. Cylindrical cavity 243 includes first, second and third portions 243a, 243b and 243c. The diameter of second portion 243b is smaller than the diameter of first portion 243a, and is greater than the diameter of third portion 243c. Second portion 243b is linked to third portion 243c through truncated cone portion 243d. First portion 243a of cavity 243 is linked to suction chamber 241 through conduit 244 which is formed in rear end plate 24. Third portion 243c of cavity 243 is linked to discharge chamber 251 through conduit 245 which also is formed in rear end plate 24. As illustrated in FIG. 1, conduit 246 is formed in rear end plate 24 to link second portion 243b of cavity 243 to hole 256 which is formed in valve plate assembly 200. Hole 256 is linked to central bore 210 through conduit 212 which is formed in the rear portion of cylinder block 21. Central bore 210 is linked to crank chamber 22 through conduit 262 formed in the inner end portion of drive shaft 26, hole 231 of spacer 230 and hole 221 of adjusting screw 220. Accordingly, second potion 243b of cavity 243 is linked to crank chamber 22 via conduit 246, hole 256, conduit 212, central bore 210, hole 221, hole 231 and conduit 262.

Figure 3:
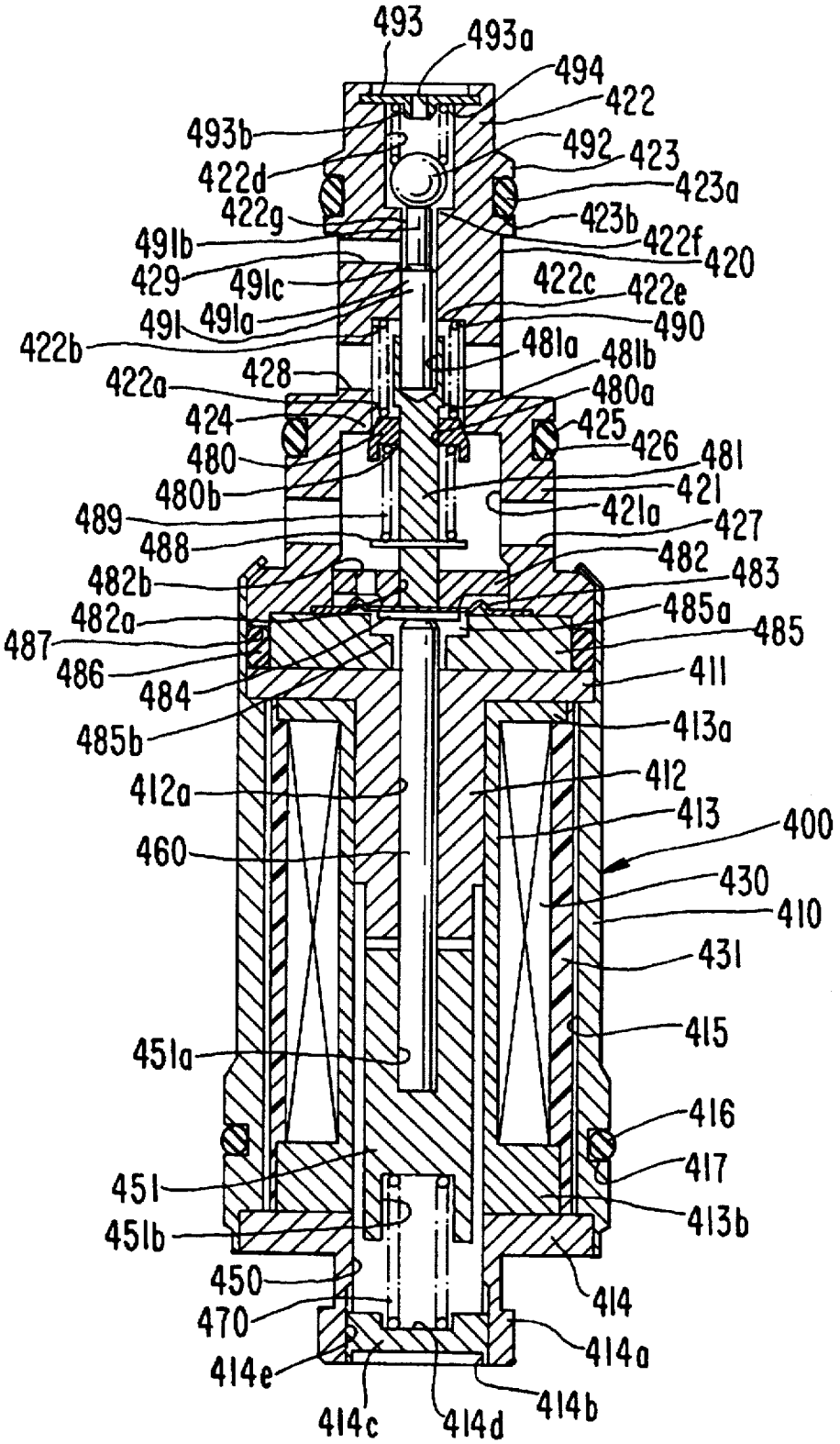
FIG. 3 illustrates an enlarged longitudinal sectional view of a capacity control mechanism 400 taken on line 3—3 of FIG. 1.

With reference to FIG. 3, capacity control mechanism 400 includes a first annular cylindrical casing 410 of magnetic material located in first portion 243a of cavity 243 and a second annular cylindrical casing 420. Casing 420 has a large diameter section 421 and a small diameter section 422 which extends upwardly from a top end of large diameter section 421. First annular cylindrical casing 410 is fixedly disposed within first portion 243a of cavity 243 by forcible insertion. Large diameter section 421 of second annular cylindrical casing 420 is fixedly disposed at a top end of first annular cylindrical casing 410. The top end of small diameter section 422 of second annular cylindrical casing 420 terminates at an upper end region of third portion 243c of cavity 243. Annular protrusion 423 is formed at an upper end region of small diameter section 421 of second annular cylindrical casing 420, and is disposed in a lower end region of third portion 243c of cavity 243. O-ring seal element 423a is disposed in annular groove 423b formed at the outer peripheral surface of annular protrusion 423 to seal the mating surfaces between the outer peripheral surface of annular protrusion 423 and the inner peripheral surface of third portion 243c of cavity 243. Thus, third portion 243c of cavity 243 is sealed off from second portion 243b of cavity 243.

First annular plate 411 is fixedly disposed at an upper inner region of first annular cylindrical casing 410, and includes an axial annular projection 412 which extends axially and downwardly from an inner peripheral end portion of first annular plate 411. Axial annular projection 412 terminates at a point approximately half the length of first annular cylindrical casing 410. Cylindrical pipe member 413, the length of which is a little less than the length of first annular cylindrical casing 410, is disposed in first annular cylindrical casing 410. Cylindrical pipe member 413 includes first and second annular flanges 413a and 413b formed at top and bottom ends thereof. An upper end portion of cylindrical pipe member 413 fixedly surrounds axial annular projection 412. Annular disc plate 414 is fixedly disposed at a bottom end of first annular cylindrical casing 410 to define an annular cavity 415 formed in cooperation with cylindrical pipe member 413 and first annular cylindrical casing 410. Annular disc plate 414 includes an axial annular projection 414a which extends axially and downwardly from an inner peripheral end portion of annular disc plate 414. Annular projection 414a includes thread portion 414b formed at an inner peripheral surface of a lower half region thereof. Adjusting screw 414c is screwed into thread portion 414b of annular projection 414a. Annular electromagnetic coil 430 is fixedly disposed within annular cavity 415. Insulating material 431, such as epoxy resin, fixedly surrounds annular electromagnetic coil 430.

Vacant space 450 is defined by cylindrical pipe member 413, axial annular projection 414a and adjusting screw 414c. Cylindrical member 451 of magnetic material is slidably disposed in the axial direction in vacant space 450. First cylindrical rod 460 slidably penetrates through axial annular projection 412. The bottom end portion of rod 460 is fixedly received in cylindrical hole 451a formed in the top end surface of cylindrical member 451 through forcible insertion. First coil spring 470 is disposed between adjusting screw 414c and cylindrical member 451. A top end of first coil spring 470 is in contact with the top end surface of cylindrical hole 451b which is formed at the bottom end surface of cylindrical member 451. A bottom end of first coil spring 470 is in contact with the bottom end surface of cylindrical depression 414d which is formed at the top end surface of adjusting screw 414c. The restoring force of first coil spring 470 urges cylindrical member 451 upwardly, thereby urging rod 460 upwardly. The restoring force of first coil spring 470 is adjusted by adjusting screw 414c.

When electromagnetic coil 430 is energized, an electromagnetic force tends to move cylindrical member 451 upwardly. The magnitude of the electromagnetic force is directly proportional to the amperage of an electric current that is supplied to electromagnetic coil 430 from an electric circuit (not shown). The electric circuit receives a signal representing the heat load on the evaporator, such as the temperature of air immediately before passing through the evaporator, and the signal representing the amount of demand for acceleration of the automobile, such as the magnitude of force on the accelerator. After processing these two signals, an electric current is supplied from the electric circuit to electromagnetic coil 430. The amperage of the electric current is continuously varied within the range from zero amperes to a predetermined maximum amperage, for example, 1.0 ampere.

More precisely, when the heat load on the evaporator is excessively large, such that the temperature of air immediately before passing through the evaporator is excessively high, and when the amount of demand for acceleration of the automobile is small, an electric current having zero amperes, i.e., no electric current, is supplied from the electric circuit to the electromagnetic coil 430. However, when the demand for acceleration of the automobile exceeds a predetermined value, the signal representing the demand for acceleration overrides the signal representing the heat load on the evaporator. As a result, an electric current having the predetermined maximum amperage is supplied from the electric circuit to the electromagnetic coil 430 even though the heat load on the evaporator is excessively large. Furthermore, when the heat load on the evaporator is excessively small, such as when the temperature of air immediately before passing through the evaporator is excessively low, an electric current having the predetermined maximum amperage is supplied from the electric circuit to the electromagnetic coil 430 without regard to the demand for acceleration of the automobile.

As further shown in FIG. 3, O-ring seal element 416 is disposed in annular groove 417 formed in the outer peripheral surface of the bottom end portion of first annular cylindrical casing 410. Seal element 416 seals the mating surfaces between the outer peripheral surface of first annular cylindrical casing 410 and the inner peripheral surface of first portion 243a of cavity 243. Thus, first portion 243a of cavity 243 is sealed off from the ambient atmosphere outside the compressor.

First valve member 480 is disposed in cylindrical hollow space 421a of large diameter section 421 of second annular cylindrical casing 420. Axial hole 480a is centrally formed in valve member 480 so that second cylindrical rod 481 can be slidably disposed therein. Second annular plate 482 is fixedly disposed at a bottom end portion of cylindrical hollow space 421a of large diameter section 421 of second annular cylindrical casing 420 by forcible insertion. Axial hole 482a is centrally formed in annular plate 482 so that the lower end portion of second cylindrical rod 481 can be slidably disposed therein. Diaphragm 483 is disposed between the bottom end surface of second cylindrical rod 481 and the top end surface of circular disc plate 484 which is disposed on a top end surface of first cylindrical rod 460. An outer peripheral portion of diaphragm 483 is fixedly disposed between the bottom end surface of the large diameter section 421 of second annular cylindrical casing 420 and the top end surface of third annular plate 485 which is sandwiched by first annular plate 411 and the bottom end of large diameter section 421 of second annular cylindrical casing 420. The top end portion of first cylindrical rod 460 slidably penetrates through third annular plate 485. Indent 485a is formed at the top end surface of third annular plate 485 so that annular ridge 485b is formed at an inner peripheral surface of third annular plate 485. Annular ridge 485b receives circular disc plate 484 disposed on the top end surface of first cylindrical rod 460.

O-ring seal element 486 is elastically disposed within annular cylindrical hollow space 487, which is defined by first and third annular plates 411 and 485, large diameter section 421 of second annular cylindrical casing 421 and first annular cylindrical casing 410. Seal element 486 seals first portion 243a of cavity 243 and cylindrical hollow space 421a of large diameter section 421 of second annular cylindrical casing 420 from ambient atmosphere.

Annular disc plate 488 is fittingly disposed in an annular groove 481c (shown in FIGS. 4–6) formed at an outer peripheral surface of second cylindrical rod 481 at a position above second annular plate 482. Second coil spring 489 surrounding second cylindrical rod 481 is resiliently disposed between a top end surface of annular disc plate 488 and a bottom surface of annular depression 480b which is formed at a bottom end surface of first valve member 480. The restoring force of second coil spring 489 urges first valve member 480 upwardly.

Small diameter section 422 of second annular cylindrical casing 420 includes cylindrical hollow space 422a having first, second and third regions 422b, 422c and 422d, respectively, which form an axial bottom end thereof. The diameter of first region 422b is greater than the diameter of second region 422c so that annular ridge 422e is formed at a position which is a boundary between first and second regions 422b and 422c. The diameter of third region 422d is greater than the diameter of second region 422c so that annular ridge 422f is formed at a position which is a boundary between second and third regions 422c and 422d.

First region 422b of cylindrical hollow space 422a is linked to the top end of cylindrical hollow space 421a at its bottom end. The diameter of cylindrical hollow space 421a is greater than the diameter of first region 422b of cylindrical hollow space 422a so that annular ridge 424 is formed at a position which is a boundary between cylindrical hollow space 421a and first region 422b of cylindrical hollow space 422a. Annular ridge 424 functions as a first valve seat which receives first valve member 480. An upper end portion of second cylindrical rod 481 is slidably disposed in the axial direction within first region 422b of cylindrical hollow space 422a. Third coil spring 490 surrounding the upper end portion of second cylindrical rod 481 is resiliently disposed between the top end surface of first valve member 480 and the side wall of annular ridge 422e. The restoring force of third coil spring 490 urges first valve member 480 downwardly.

Second cylindrical rod 481 includes annular ridge 481b formed at an outer peripheral surface thereof so as to receive the top end surface of an inner peripheral portion of first valve member 480. Second cylindrical rod 481 further includes axial hole 481a formed at the top end surface thereof. A bottom end portion of third cylindrical rod 491 is forcibly inserted into axial hole 481a so that second and third cylindrical rods 481 and 491 are fixedly connected to each other.

Third cylindrical rod 491 includes large diameter section 491a, small diameter section 491b and truncated cone section 491c which connects a top end of large diameter section 491a to a bottom end of small diameter section 491b. An upper half portion of large diameter section 491a of third cylindrical rod 491 is fittingly and slidably disposed in a lower half portion of second region 422c of cylindrical hollow space 422a. Small diameter section 491b of third cylindrical rod 491 is disposed in an upper half portion of second region 422c of cylindrical hollow space 422a to define radial air gap 422g between the outer peripheral surface of small diameter section 491b of third cylindrical rod 491 and the inner peripheral surface of the upper half portion of second region 422c of cylindrical hollow space 422a. A top end surface of third cylindrical rod 491, which is located near annular ridge 422f, moves toward and away from third region 422d of cylindrical hollow space 422a in response to changes in an operational condition of capacity control mechanism 400.

Ball element 492, which forms a second valve member, is loosely disposed within third region 422d of cylindrical hollow space 422a. Circular disc plate 493 is fixedly disposed at the top end of small diameter section 422 of second annular cylindrical casing 420. Axial hole 493a is centrally formed through circular disc plate 493 to link third portion 243c of cavity 243 to third region 422d of cylindrical hollow space 422a. Axial projection 493b projects axially downwardly from an inner peripheral end of axial hole 493a, which is formed at a bottom end surface of circular disc plate 493. Fourth coil spring 494 surrounding axial projection 493b is resiliently disposed between the bottom end surface of circular disc plate 493 and the upper spherical surface of ball element 492. The restoring force of fourth coil spring 494 urges ball element 492 downwardly. Annular ridge 422f functions as a second valve seat for receiving ball element 492.

O-ring seal element 425 is disposed in an annular groove 426 formed at the outer peripheral surface of large diameter section 421 of second annular cylindrical casing 420 to seal the mating surfaces between the outer peripheral surface of large diameter section 421 of second annular cylindrical casing 420 and the inner peripheral surface of second portion 243b of cavity 243. Thus, second portion 243b of cavity 243 is sealed off from first portion 243a of cavity 243.

A plurality of first radial holes 427 are formed at a side wall of large diameter section 421 of second annular cylindrical casing 420 to link first portion 243a of cavity 243 to cylindrical hollow space 421a of large diameter section 421 of second annular cylindrical casing 420. Therefore, fluid communication between suction chamber 241 and cylindrical hollow space 421a of large diameter section 421 of second annular cylindrical casing 420 is obtained through conduit 244, first portion 243a of cavity 243 and radial holes 427.

A plurality of second radial holes 428 are formed at a side wall of a lower end portion of small diameter section 422 of second annular cylindrical casing 420 to link second portion 243b of cavity 243 to fast region 422b of cylindrical hollow space 422a of small diameter section 422 of second annular cylindrical casing 420. Therefore, fluid communication between crank chamber 22 and first region 422b of cylindrical hollow space 422a of small diameter section 422 of second annular cylindrical casing 420 is obtained through conduit 262, hole 231, hole 221, central bore 210, conduit 212, hole 256, conduit 246, second portion 243b of cavity 243 and radial holes 428.

A plurality of third radial holes 429 are formed at a side wall of small diameter section 422 of second annular cylindrical casing 420 at a position between radial holes 428 and O-ring seal element 423a to link second portion 243b of cavity 243 to radial air gap 422g. Therefore, fluid communication between crank chamber 22 and radial air gap 422g is obtained through conduit 262, hole 231, hole 221, central bore 210, conduit 212, hole 256, conduit 246, second portion 243b of cavity 243 and radial holes 429.

Furthermore, third region 422d of cylindrical hollow space 422a of small diameter section 422 of second annular cylindrical casing 420 communicates with discharge chamber 251 via conduit 245, third portion 243c of cavity 243 and hole 493a of circular disc plate 493.

In the above mentioned construction of capacity control mechanism 400, second and third coil springs 489 and 490 are selected to bias the top end surface of first valve member 480 against a side wall of annular ridge 481b. As long as the top end surface of first valve member 480 is in contact with the side wall of annular ridge 481b, second cylindrical rod 481, first valve member 480, second coil spring 489 and annular disc plate 488 are regarded as substantially one body. Therefore, the top end surface of the central region of diaphragm 483 is maintained in contact with the bottom end surface of second cylindrical rod 481 by virtue of the restoring force of third coil spring 490 until first valve member 480 is received on annular ridge 424. Similarly, the bottom end surface of the central region of diaphragm 483 is maintained in contact with the top end surface of circular disc plate 484 by virtue of the restoring force of first coil spring 470.

Indent 485a which is formed at the top end surface of third annular plate 485, faces the bottom end surface of diaphragm 483. Indent 485a is linked to the ambient atmosphere outside of the compressor via gap 412a created between rod 460 and annular projection 412, vacant space 450, and the gap 414e created between axial annular projection 414a and adjusting screw 414c. Thus, the bottom end surface of diaphragm 483 is in contact with and thereby receives air at atmospheric pressure.

Similarly, cylindrical hollow space 421a of large diameter section 421 of second annular cylindrical casing 420 is linked to suction chamber 241 via radial holes 427, first portion 243a of cavity 243, and conduit 244. Thus, the top end surface of diaphragm 483 is in contact with and thereby receives refrigerant gas at the suction chamber pressure through a plurality of axial holes 482b axially formed through a peripheral portion of annular plate 482.

Figure 6:
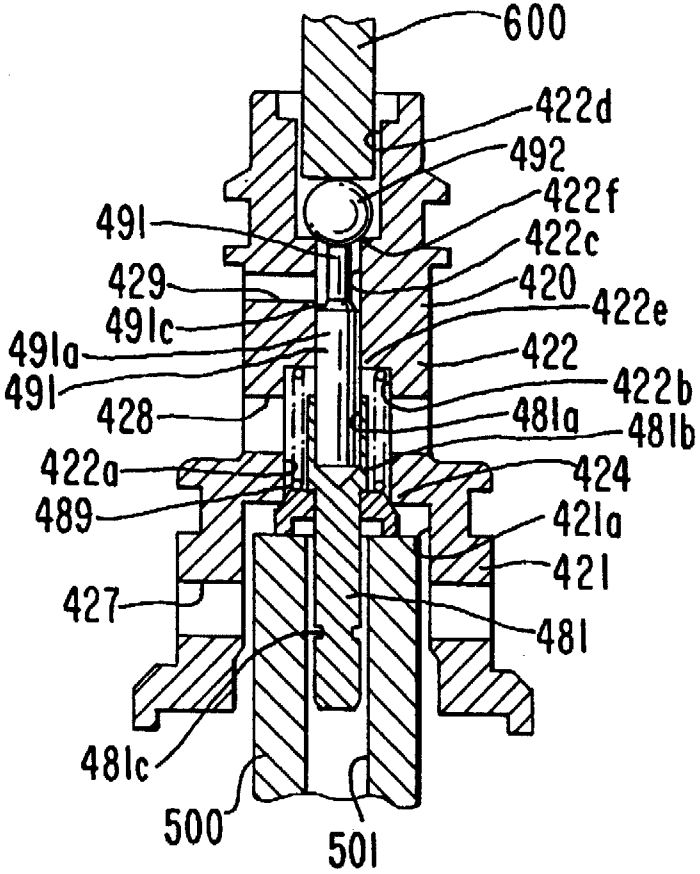
FIGS. 4–6 illustrate part of an assembling process for the valve control mechanism shown in FIG. 3.
Figure 5:
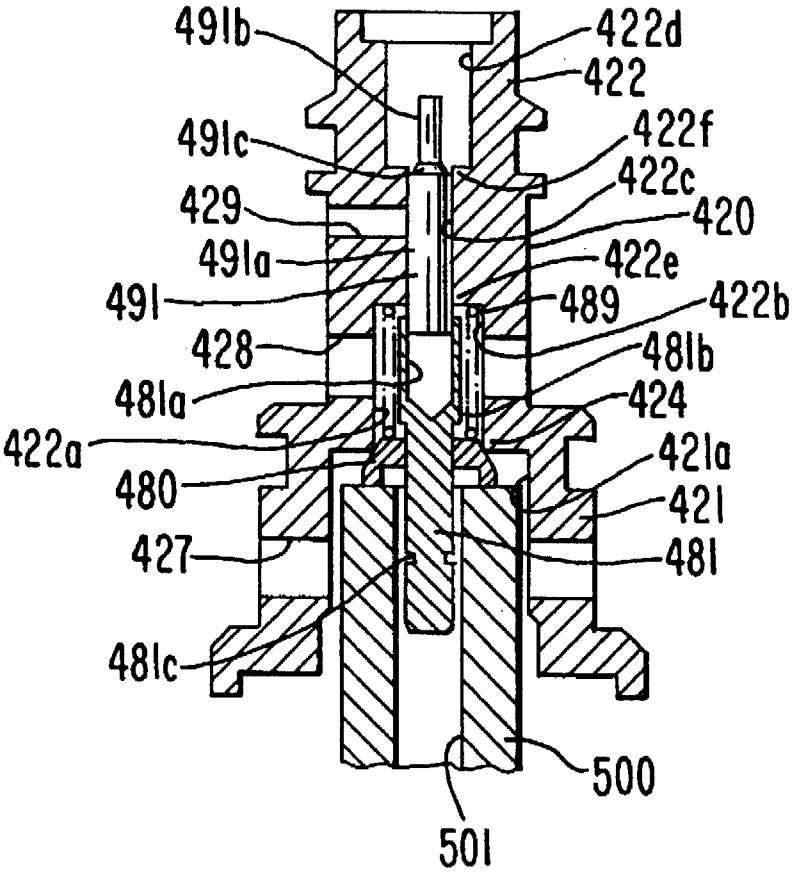
Figure 4:
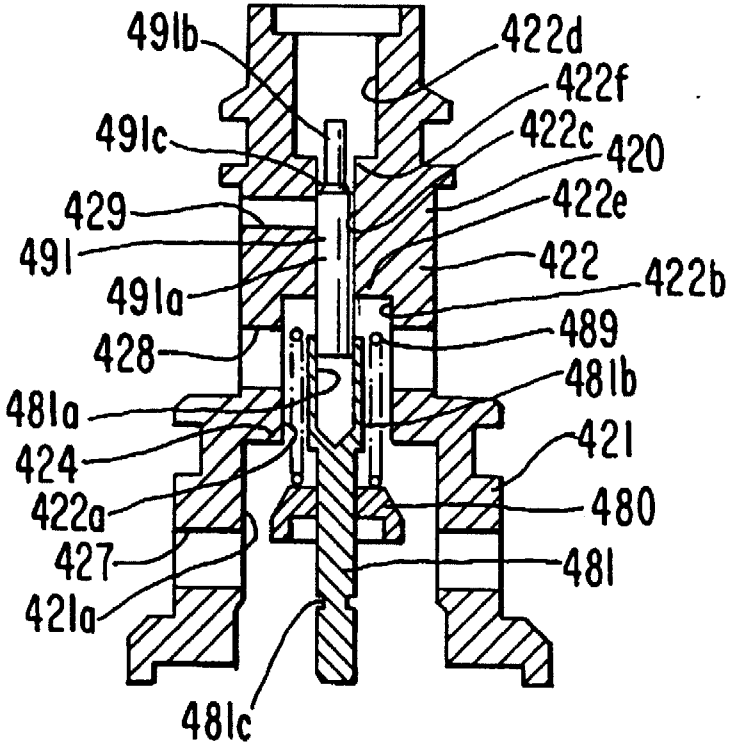

With reference to FIGS. 4–6, part of the assembling process for capacity control mechanism 400 is illustrated and described below. With reference to FIG. 4, second and third cylindrical rods 481 and 491 are temporarily connected to each other by slightly and forcibly inserting the bottom end portion of third cylindrical rod 491 into axial hole 481a of second cylindrical rod 481. First valve member 480 on which second coil spring 489 is disposed is slidably mounted about second cylindrical rod 481. Third cylindrical rod 491 then is slidably inserted into second region 422c of cylindrical hollow space 422a so as to sufficiently project small diameter section 491b of third cylindrical rod 491 into third region 422d of cylindrical hollow space 422a.

With reference to FIG. 5, in the next step of the assembly process, the bottom end surface of first valve member 480 is pushed upwardly by inserting annular cylindrical member 500 into cylindrical hollow space 421a. Second cylindrical rod 481 simultaneously projects into inner hollow space 501 of annular cylindrical member 500 until first valve member 480 is received on annular ridge 424. In this step, small diameter section 491b of third cylindrical rod 491 is further projected into third region 422d of cylindrical hollow space 422a. In addition, the tope end surface of first valve member 480 is not in contact with the side wall of annular ridge 481b when first valve member 480 is received on annular ridge 424.

With reference to FIG. 6, in a final step of the assembling process of capacity control mechanism 400, the top end surface of small diameter section 491b of third cylindrical rod 491 is pushed downwardly through ball element 492 by inserting cylindrical member 600 into third region 422d of cylindrical hollow space 422a until ball element 492 is received on annular ridge 422f. At the same time, first valve member 480 is upwardly urged by annular cylindrical member 500. In this step, the bottom end portion of third cylindrical rod 491 is forcibly inserted into axial hole 481a of second cylindrical rod 481. In addition, the top end surface of first valve member 480 is in contact with the side wall of annular ridge 481b when ball element 492 is received on annular ridge 422f.

Figure 7:
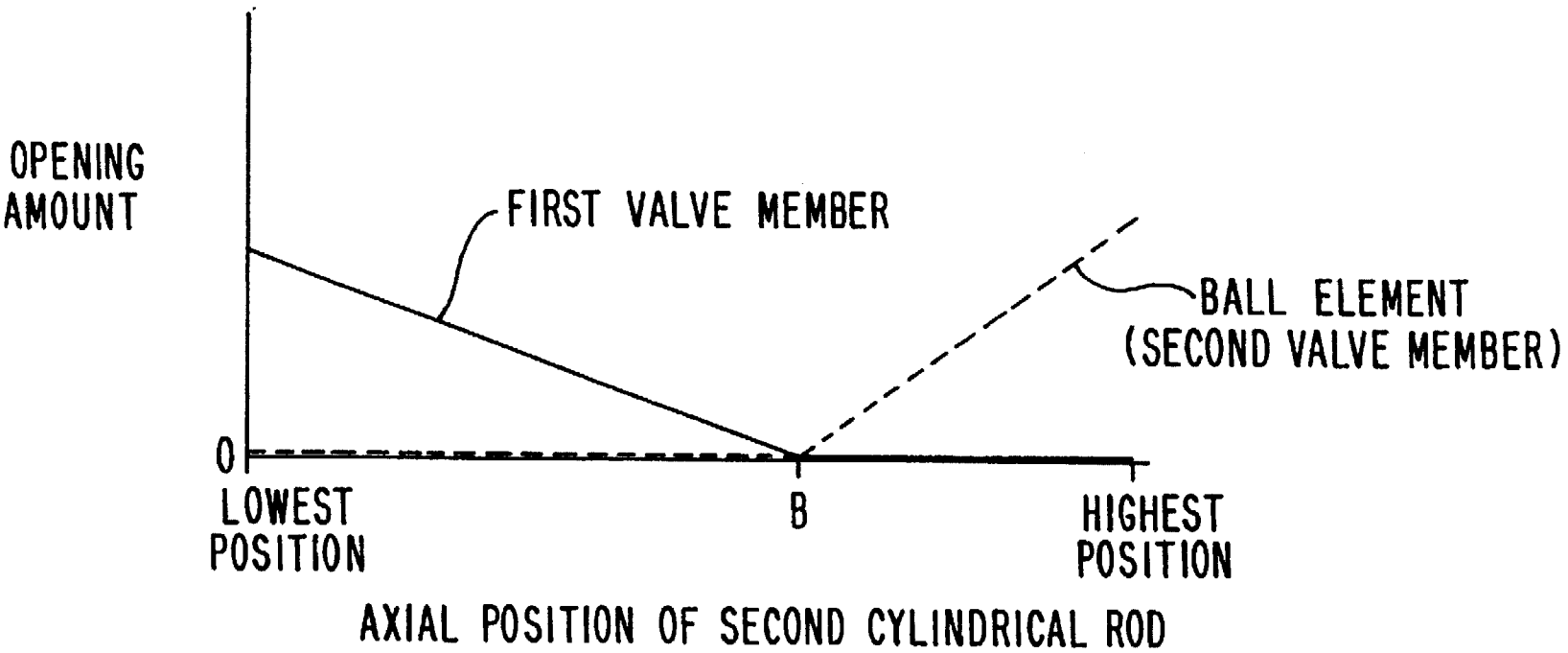
FIG. 7 is a graph illustrating the operation of first and second valve member shown in FIG. 3.

With reference to FIG. 7, during operation of capacity control mechanism 400, when second cylindrical rod 481 is located at position "B", both first valve member 480 and ball element 492 are received on annular ridges 424 and 422f, respectively. When second cylindrical rod 481 is located below position "B", first valve member 480 continuously moves away from annular ridge 424 while ball element 491 is continuously received on annular ridge 422f. When second cylindrical rod 481 is located above the position "B", first valve member 480 is continuously received on annular ridge 424 while ball element 492 continuously moves away from annular ridge 422f.

During operation of compressor 10, drive shaft 26 is rotated by the engine of the automobile through electromagnetic clutch 300. Cam rotor 40 is rotated with drive shaft 26, thereby rotating slant plate 50 as well, which in turn causes wobble plate 60 to nutate. The nutation motion of wobble plate 60 then reciprocates pistons 71 out of phase in their respective cylinders 70. As pistons 71 are reciprocated, refrigerant gas is introduced into suction chamber 241 through inlet portion 241a, flows into each cylinder 70 through suction ports 242, and then is compressed. The compressed refrigerant gas then is discharged to discharge chamber 251 from each cylinder 70 through discharge ports 252, and continues into the cooling circuit through outlet portion 251a.

The capacity of compressor 10 is adjusted in order to maintain a constant pressure in suction chamber 241, irrespective of the changes in the heat load on the evaporator or the rotational speed of the compressor. The capacity of the compressor is adjusted by changing the angle of the slant plate, which is dependent upon the crank chamber pressure, or more precisely, which is dependent upon the differential between the crank chamber and the suction chamber pressures. During operation of compressor 10, the pressure of the crank chamber increases due to blow-by gas flowing past pistons 71 as they reciprocate in cylinders 70. As the crank chamber pressure increases relative to the suction chamber pressure, the slant angle of slant plate 50 as well as the slant angle of wobble plate 60 decreases, thereby decreasing the capacity of the compressor. Likewise, a decrease in the crank chamber pressure relative to the suction chamber pressure causes an increase in the capacity of the compressor.

The operation of capacity control mechanism 400 of compressor 10 in accordance with one embodiment of the present invention is carried out in the following manner. With reference to FIGS. 1, 3, 7 and 8, when the suction chamber pressure is maintained at a predetermined pressure such as 2.0 $kg/cm^2G$ by continuously supplying an electric current having 0.5 A from the electric circuit to electromagnetic coil 430, second cylindrical rod 481 moves upwardly and downwardly at a certain frequency by a slight amount at a position slightly below position "B" in response to slight changes in the heat load on the evaporator. That is, slight changes in the suction chamber pressure act on the top end surface of diaphragm 483 while ball element 492 is continuously received on annular ridge 422f so as to continuously block fluid communication between the crank and discharge chambers 22 and 251. First valve member 480 moves away from annular ridge 424 at a certain frequency to slightly change its opening amount while ball element 492 is continuously received on annular ridge 422f so as to continuously block fluid communication between the crank and discharge chambers 22 and 251. Accordingly, at this stage of compressor operation, the suction chamber pressure is maintained at a predetermined value such as 2.0 kg/cm$^2$G by virtue of the performance of only first valve member 480.

At the above mentioned stage of operation, when the demand for acceleration of the automobile exceeds a predetermined value, an electric current having a predetermined maximum amperage, e.g., 1.0 A, is supplied from the electric circuit to electromagnetic coil 430. The amperage of the electric current supplied from the electric circuit to electromagnetic coil 430 is suddenly increased a large amount from 0.5 A to 1.0 A. Accordingly, the electromagnetic force which tends to move first cylindrical rod 460 upwardly also is increased a large amount so that the upward force acting on diaphragm 483 overcomes the downward force acting on diaphragm 483. Therefore, second and third cylindrical rods 481 and 491 move upwardly, and first valve member 480 is received on annular ridge 424 and maintains contact between the top end surface of first valve member 480 and the side wall of annular ridge 481b. As soon as the side wall of annular ridge 481b begins to move away from the top end surface of first valve member 480, the restoring force of third coil spring 490 acting downwardly on diaphragm 483 becomes ineffectual while the restoring force of second coil spring 489 also acting downwardly on diaphragm 483 becomes effectual.

At a time immediately after first valve member 480 is received on annular ridge 424, the crank chamber pressure slightly increases due to the block in fluid communication between crank and suction chambers 22 and 241. However, the relative value of the crank chamber pressure and the suction chamber pressure still is insufficient to change (or decrease) the slant angle of slant plate 50 and wobble plate 60 with respect to the plane perpendicular to the longitudinal axis of drive shaft 26. Slant plate 50 and wobble plate 60 are maintained at their positions at the time immediately before first valve member 480 is received on annular ridge 424 so that the suction chamber pressure remains unchanged.

Accordingly, the resultant of the atmospheric pressure force acting upwardly on diaphragm 483, the restoring force of first coil spring 470 and the electromagnetic force induced by electromagnetic coil 430 overcomes the resultant of the suction chamber pressure force acting downwardly on diaphragm 483, the restoring force of second coil spring 489, the restoring force of fourth coil spring 494 and the discharge chamber pressure force acting downwardly on the effective pressure receiving surface of ball element 492. As a result, second and third cylindrical rods 481 and 491 move upwardly to disengage the side wall of annular ridge 481b from the top end surface of first valve member 480 while first valve member 480 is received on annular ridge 424. That is, second cylindrical rod 481 moves upwardly to a position which is higher than position "B". Ball element 492 then moves away from annular ridge 422f to allow fluid communication between discharge and crank chambers 251 and 22 while first valve member 480 is received on annular ridge 424 so as to block fluid communication between crank and suction chambers 22 and 241.

As a consequence of the above action, a large amount of the refrigerant gas in discharge chamber 251 instantly flows into crank chamber 22 so that the crank chamber pressure is instantly increased by a large amount, thereby instantly decreasing the slant angle of slant plate 50 and wobble plate 60 to the minimum value; and therefore, compressor 10 operates at a minimum capacity displacement. This effectively reduces the energy consumption by the compressor, or in other words, reduces the driving force derived from the automobile engine. As a result, the variable capacity mechanism of the present invention is effective in responding to the acceleration demands of the vehicle.

As compressor 10 continues to operate at the minimum capacity displacement, the suction chamber pressure gradually increases. The resultant force acting downwardly on diaphragm 483 gradually increases relative to the resultant force acting upwardly on diaphragm 483. Accordingly, second and third cylindrical rods 481 and 491, and ball element 492, gradually move downwardly. When the suction chamber pressure rises to a predetermined value such as 4.0 kg/cm$^2$G, ball element 492 is received on annular ridge 422f to block fluid communication between crank and discharge chambers 22 and 251. Thereafter, the suction chamber pressure is continuously controlled at 4.0 kg/cm$^2$G by virtue of the performance of only first valve member 480 by continuously supplying an electric current having 1.0 A from the electric circuit to electromagnetic coil 430.

In the above mentioned stage of compressor operation, when the resultant of the crank chamber pressure force acting downwardly on the top end effective pressure receiving surface of first valve member 480 and the restoring force of third coil spring 490 exceeds the resultant of the suction chamber pressure force acting upwardly on the bottom end effective pressure receiving surface of first valve member 480 and the restoring force of second coil spring 489, fast valve member 480 slides downwardly along second cylindrical rod 481 so as to create an annular air gap between first valve member 480 and annular ridge 424 so that refrigerant gas in crank chamber 22 can flow into suction chamber 241 past the annular air gap. Accordingly, excessive pressure differential between the crank chamber 22 and the suction chamber 241 due to excessive conduction of refrigerant gas from discharge chamber 251 to crank chamber 22, which would generate a force excessively urging wobble plate 60 rearwardly, is effectively eliminated. Excessive rearward movement of wobble plate 60, which would result in excessive frictional contact between the rear end surface of annular projection 65 of wobble plate 60 and the front end surface of balance weight ring 80 and between the inner end surface of drive shaft 26 and a front end surface of spacer 230 disposed in central bore 210, can be effectively prevented. Accordingly, first valve member 480 further functions as a safety valve device when ball element 492 moves away from annular ridge 422f so that it is not required to form an additional passageway within which the safety valve device is disposed.

Figure 8:
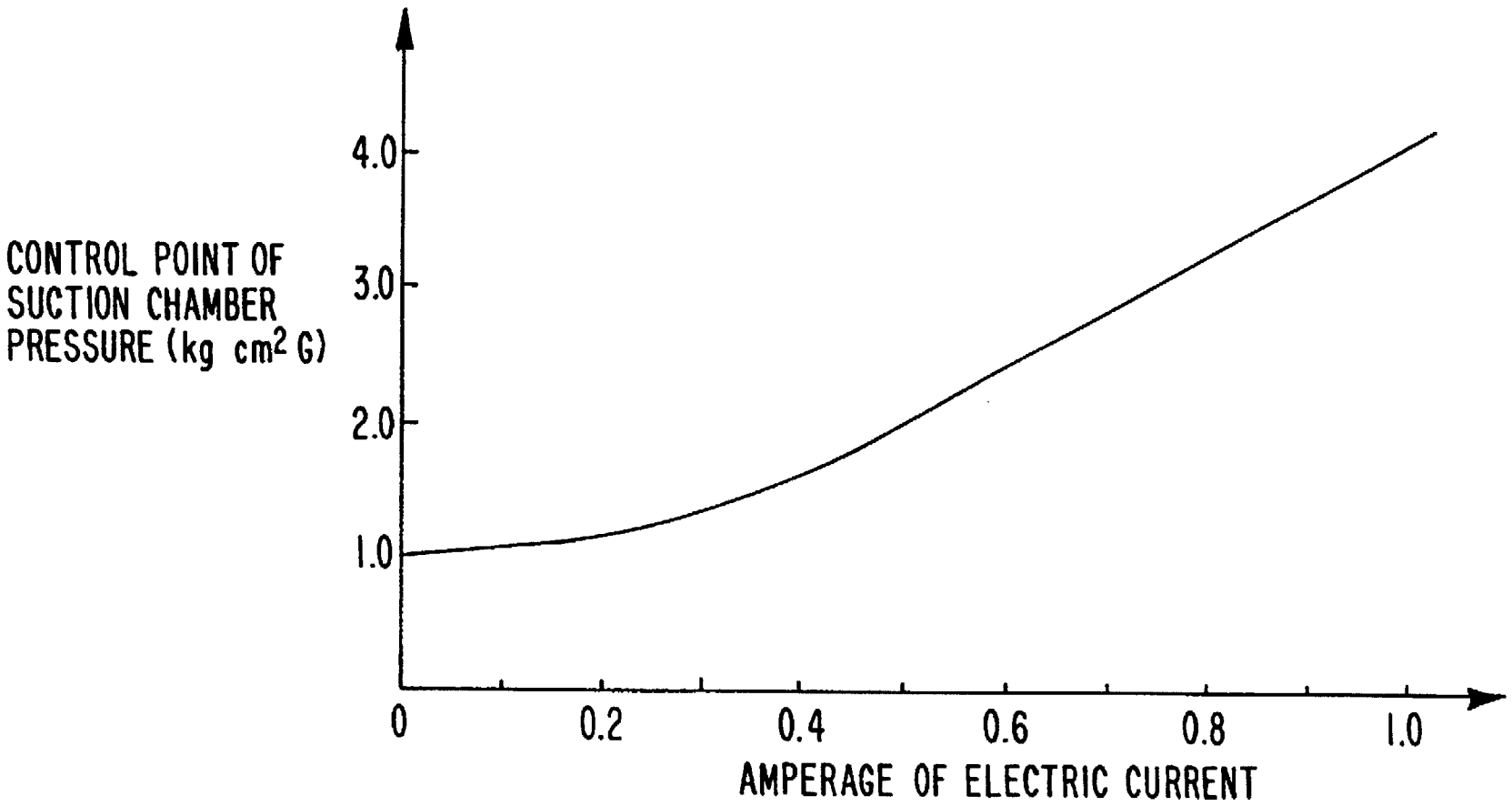
FIG. 8 is a graph illustrating the relationship between a control point of suction chamber pressure and amperage of an external electric current supplied to an electromagnetic coil of the valve control mechanism according to one embodiment of this invention.

Furthermore, referring to FIG. 8, whenever the amperage of the electric current supplied to electromagnetic coil 430 is reduced so as to lower the control point of the suction chamber pressure, the resultant force acting downwardly on diaphragm 483 overcomes the resultant force acting upwardly on diaphragm 483 so that ball element 492 is maintained on annular ridge 422f to block fluid communication between crank and discharge chambers 22 and 251.

As described above, only when the amperage of the electric current supplied to electromagnetic coil 430 is increased so as to raise the control point of the suction chamber pressure, the resultant force acting upwardly on diaphragm 483 is raised to exceed the resultant force acting downwardly on diaphragm 483 so that ball element 492 can move away from annular ridge 422f so as to provide fluid communication between crank and discharge chambers 22 and 251. In other words, ball element 492 can only operate to permit fluid communication between crank and discharge chambers 22 and 251 when the control point of the suction chamber pressure is relatively low.

In the present invention, since first valve member 480 and ball element 492 do not simultaneously move away from their respective annular ridges 424 and 422f, a communication path linking crank chamber 22 and second portion 243b of cylindrical cavity 243 forms a part of both the communication path linking crank and discharge chambers 22 and 251 and the communication path linking crank and suction chambers 22 and 241. Moreover, in the preferred embodiment of the present invention, diaphragm 483 is used as a pressure sensing device for sensing pressure in suction chamber 241, though other pressure sensing devices such as a bellows may be used in the present invention.

This invention has been described in connection with the preferred embodiment. This embodiment, however, is merely exemplary only and the invention is not restricted thereto. It will be understood by those skilled in the art that variations can easily be made within the scope of this invention as defined by the claims.

I claim:

1. A slant plate type refrigerant compressor comprising:

a compressor housing enclosing a crank chamber, a suction chamber and a discharge chamber therein, said compressor housing comprising a cylinder block having a plurality of cylinders formed therethrough;

a piston slidably fitted within each of said cylinders;

drive means coupled to said pistons for reciprocating said pistons within said cylinders, said drive means including a drive shaft rotatably supported in said housing and coupling means for drivingly coupling aid drive shaft to said pistons such that rotary motion of said drive shaft is converted into reciprocating motion of said pistons, said coupling means including a slant plate having a surface disposed at an adjustable inclined angle relative to a plane perpendicular to said drive shaft, the slant angle changing in response to a change in pressure in said crank chamber relative to pressure in said suction chamber to thereby change the capacity of said compressor;

a first communication path linking said crank chamber with said suction chamber;

a first valve control mechanism disposed within said first communication path, said first valve control mechanism controlling fluid communication through said first communication path in response to changes in pressure in said suction chamber;

a second communication path linking said crank chamber with said discharge chamber, said first and second communication paths sharing a common portion linked to said crank chamber; and a second valve control mechanism disposed within said second communication path, said second valve control mechanism responding to an external signal to open said second communication path to increase the pressure in said crank chamber to thereby reduce the capacity of the compressor, fluid communication through said first communication path being continuously controlled by said first valve control mechanism to maintain pressure in said suction chamber at a predetermined constant value as long as said second communication path is closed, hid second communication path being continuously opened as long as said first communication path is closed and said common portion being selectively coupled to the open one of said first or second communication paths.

2. The slant plate type refrigerant compressor of claim 1, said first valve control mechanism including a first valve member, said first communication path including a first valve seat formed at one portion thereof, said second valve control mechanism including a second valve member, said second communication path including a second valve seat formed at one portion thereof, fluid communication through said first communication path being continuously controlled by said first valve control mechanism so as to maintain pressure in said suction chamber at a predetermined constant value as long as said second valve member is received on said second valve seat, said second valve member moving away from said second valve seat as long as said first valve member is received on said first valve seat.

3. The slant plate type refrigerant compressor of claim 2 wherein said first valve member is forcibly moved away from said first valve seat to open said first communication path when the pressure difference between the crank chamber and the suction chamber exceeds a predetermined value.

4. The slant plate type refrigerant compressor of claim 1 wherein said first communication path is forcibly opened when the pressure difference between the crank chamber and the suction chamber exceeds a predetermined value.

5. A slant plate type refrigerant compressor comprising:

a compressor housing enclosing a crank chamber, a suction chamber and a discharge chamber therein, said compressor housing comprising a cylinder block having a plurality of cylinders formed therethrough;

a piston slidably fitted within each of said cylinders;

drive means coupled to said pistons for reciprocating said pistons within said cylinders, said drive means including a drive shaft rotatably supported in said housing and coupling means for drivingly coupling said drive shaft to said pistons such that rotary motion of said drive shaft is converted into reciprocating motion of said pistons, said coupling means including a slant plate having a surface disposed at an adjustable inclined angle relative to a plane perpendicular to said drive shaft, the slant angle changing in response to a change in pressure in said crank chamber relative to pressure in said suction chamber to change the capacity of said compressor;

a first communication path linking said crank chamber with said suction chamber;

a first valve control mechanism disposed within said first communication path, said first valve control mechanism controlling fluid communication through said first communication path in response to change in pressure in said suction chamber;

a second communication path linking said crank chamber with said discharge chamber, said first and second communication paths sharing a common portion linked to said crank chamber; and a second valve control mechanism disposed within said second communication path, said second valve control mechanism responding to an external signal to open said second communication path to increase the pressure in said crank chamber to thereby reduce the capacity of the compressor, said first and second valve control mechanisms functioning to prevent said first and second communication paths from opening simultaneously and to selectively couple said common portion to one of said first or second communication paths.

* * * * *